R. J. L. MOINEAU.
LANDING CARRIAGE FOR AEROPLANES.
APPLICATION FILED AUG. 28, 1919.

1,360,668.

Patented Nov. 30, 1920.

Inventor.
René Joseph Louis Moineau.
By
Attorney.

UNITED STATES PATENT OFFICE.

RENÉ JOSEPH LOUIS MOINEAU, OF PARIS, FRANCE.

LANDING-CARRIAGE FOR AEROPLANES.

1,360,668.  Specification of Letters Patent.  Patented Nov. 30, 1920.

Application filed August 28, 1919. Serial No. 320,404.

*To all whom it may concern:*

Be it known that I, RENÉ JOSEPH LOUIS MOINEAU, citizen of the Republic of France, residing at 24 Rue de Passy, Paris, France, have invented certain new and useful Improvements in Landing-Carriages for Aeroplanes, of which the following is a specification.

This invention relates to a landing carriage for aeroplanes which may be retracted into the wings so as to eliminate the resistance offered to the air by the landing carriage in flight.

For this purpose, the landing carriage, which comprises as usual supporting wheels connected to the fuselage by uprights or struts, is so arranged that the right and left hand parts of the same may rotate about axes passing through the wing and so located that each part by rotating about said axes and being lifted laterally will be concealed within the thickness of the wing.

Figure 1:
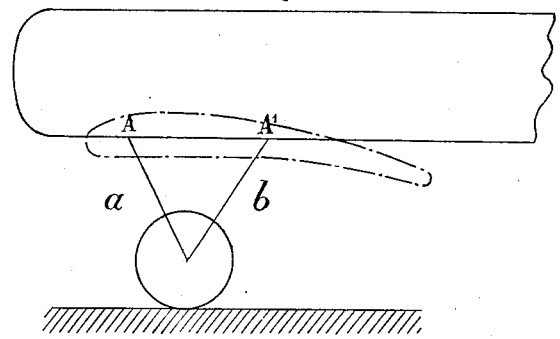

In the annexed drawing which shows diagrammatically and by way of example an embodiment of the invention:

Figure 1 is a partial side view and

Figure 2:
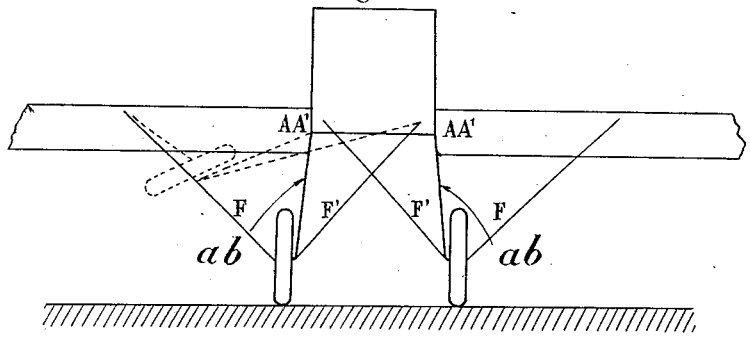

Fig. 2, an end view of an aeroplane constructed in accordance with the invention, the landing carriage being shown in its normal position upon the ground.

Figure 3:
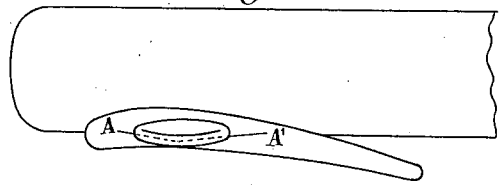
Figure 4:
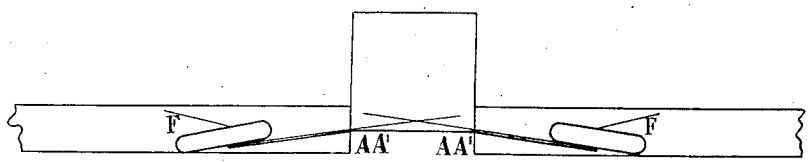

Figs. 3 and 4 are corresponding views showing the landing carriage concealed within the thickness of the wings.

In the embodiment shown in the drawing, the landing carriage is composed of two wheels which are connected to the fuselage by two struts $a$, $b$ arranged at an angle to each other and forming a V shaped frame. The axes AA′ are located along the edge of the fuselage at the jointing points with the wings. By lifting laterally the two V frames to the right and to the left, each of the said frames and the corresponding wheel will be received in a suitable recess provided in the thickness of the wing.

For the purpose of lifting the landing carriage in the manner just mentioned, it will be sufficient to exert a pull on the wires F one end of which is attached to the wheels while the other end is connected to an operating member placed within reach of the pilot's hand.

For pulling down the landing carriage out of the recesses in the wings when landing, it will be sufficient to pull on the wires F′ which are likewise connected to the operating member placed within reach of the pilot. Fig. 2 shows in broken lines an intermediate position of one of the wheels in the course of raising or lowering the landing carriage.

The position of the V frames could also be set by means of connecting rods which would also disappear within the wings.

Having now described my invention what I claim as new and desire to secure by Letters Patent is:

1. An aeroplane comprising in combination a fuselage, wings secured to said fuselage and provided each with a recess; a landing carriage comprising two lateral parts pivotally mounted on said fuselage and means whereby the landing carriage parts may be lowered to its operative position or raised laterally to a position in which they are concealed in the recesses in the wings.

2. An aeroplane comprising in combination a fuselage, wings secured to said fuselage, two axles, two supporting wheels on said axles, two V shaped frames, connected each at one apex to the corresponding wheel axle and pivotally connected by its opposite side to one longitudinal outer edge of the fuselage, and means whereby each V frame with the corresponding wheel may be lowered to its operative position or raised laterally to a position in which it is concealed within the corresponding wing.

3. An aeroplane comprising in combination, a fuselage, wings secured to said fuselage, two axles, two supporting wheels on said axles, two V shaped frames, connected each at one apex to the corresponding wheel axle and pivotally connected along the opposite side to one longitudinal outer edge of the fuselage, wires extending from said frames in opposite lateral directions and means within reach of the pilot and operatively connected to said wires.

In testimony whereof I have signed my name to this specification in the presence of a subscribing witness.

RENE JOSEPH LOUIS MOINEAU.

Witness:
CHAS. P. PRESSLY.